United States Patent [19]

Sakata et al.

[11] Patent Number: 4,630,381
[45] Date of Patent: Dec. 23, 1986

[54] COORDINATE MEASURING INSTRUMENT

[75] Inventors: Hideo Sakata; Eiichi Tsunoda, both of Kawasaki, Japan

[73] Assignee: Mitutoyo Mfg. Co., Ltd., Tokyo, Japan

[21] Appl. No.: 753,305

[22] Filed: Jul. 10, 1985

[30] Foreign Application Priority Data

Jul. 24, 1984 [JP] Japan ................................ 59-154784
Jul. 24, 1984 [JP] Japan ................................ 59-154785

[51] Int. Cl.$^4$ .............................................. G01B 7/03
[52] U.S. Cl. ...................................... 33/503; 33/1 M
[58] Field of Search ............................. 33/503, 1 M

[56] References Cited

U.S. PATENT DOCUMENTS 4,442,607  4/1984  Sakata et al. ...................... 33/1 M
4,551,919 11/1985  Sakata et al. ...................... 33/503

FOREIGN PATENT DOCUMENTS

2248194 4/1973 Fed. Rep. of Germany .
2754500 6/1978 Fed. Rep. of Germany .
1393035 5/1975 United Kingdom .
2112522 7/1983 United Kingdom .

Primary Examiner—William D. Martin, Jr.
Attorney, Agent, or Firm—Flynn, Thiel, Boutell & Tanis

[57] ABSTRACT

A coordinate measuring instrument wherein a measuring element is related to a work to be measured, and a configuration or the like of the work is measured from a displacement of this measuring element. In this measuring instrument, one of supports is supported by one of guide rails in a manner to be positionally adjustable in direction of X- and Z-axes and the other of the supports is supported in a manner to be displaceable only in a direction of one of the guide rails. A slider guide rail racked across the supports can be adjusted in its posture in the direction of X- and Z-axes by a posture adjusting mechanism provided on connecting portions between the slider rail and the supports. The slider guide rail thus adjusted in posture in non-displaceable in the moving direction of a slider in a state where adjustment members provided on the slider guide rail are closely abutted against abutting surfaces of the supports.

11 Claims, 8 Drawing Figures

COORDINATE MEASURING INSTRUMENT

BACKGROUND OF THE INVENTION

1. Field of the Invention

This invention relates to a coordinate measuring instrument, wherein a measuring element is displaceable on two or more axes perpendicularly intersecting one another as in a two-dimensional and three-dimensional measuring instruments and a configuration or the like of a work to be measured can be measured from a displacement of this measuring element.

2. Description of the Prior Art

Two-dimensional and three-dimensional measuring instruments, wherein a measuring element displaceable in two-dimensional or three-dimensional directions is brought into contact with a surface of a work to be measured and a configuration or the like of the work is measured from the displacement of the measuring element, are utilized in every fields of industry because of their high measuring accuracy.

The three-dimensional measuring instrument is provided with a mechanism, by which the measuring element can be displaced in directions of X-, Y- and Z-axis perpendicularly intersecting one another.

As a mechanism for displacing the measuring element in directions of three axes, there has been provided one in which, for example, a plurality of supports are erected on the top surface of a bedplate, two rails extending in the direction of Y-axis are provided in parallel to each other on these supports, a beam extending in the direction of X-axis is stretched across these rails in a manner to be movable in the direction of Y-axis, a slider is mounted on the rail provided on this beam in a manner to be movable in the direction of X-axis, further, a spindle is provided on this slider in a manner to be slidable in the direction of Z-axis, and a measuring element is fixed to one end of this spindle. In other words, this mechanism as a whole has been constructed by a stacking system and the positional reference thereof has been sought from the bedplate or another basis.

In consequence, the conventional construction has presented such disadvantages that the configuration of legs should have borne the load as a structure of making the measuring element to move in the coordinate directions, whereby the construction should necessarily be large-sized, while the measurable scope is extremely limited. Furthermore, the supports should be vertical to the bedplate or the like and in parallel to opposite sides thereof, further, the height of the supports should be accurately finished and assembled, and the adjustments in these works should be made in $\mu$m order, thus requiring excessive labor hours.

Furthermore, a main scale is provided on the side of the bedplate along the moving direction of the supports and an index scale opposed to the main scale is provided on the side of the supports, and the position of the supports are detected by the scales. However, if the main scale is directed upwardly, the main scale is subjected to damages and contaminations depending on the environment of use, thus possibly causing a trouble to detecting the position.

On the other hand, if the main scale is disposed transversely, damages and adhesion of contaminations may be relieved, however, a lock knob or the like for locking the supports should be mounted to the top surface thereof, with the result that, the lock knob or the like protrudes upwardly from the top surface of the bedplate, thus possibly causing a trouble to the carry-in and carry-out works for the work to be measured.

Further, the supports should be vertical to the bedplate or the like and in parallel to the opposite sides thereof, the supports should be accurately finished and assembled in their heights, subsequently, the structure to be supported by these supports should be assembled to be in parallel and vertical to the X-, Y- and Z-axes successively, and further, after the adjustments are made in this assembled structure, scales are fixed in a manner to be in parallel to the slider and the like with predetermined clearances, thus requiring extremely complicated steps and high skill level.

This leads to that the finishing accuracy of one of the parts renders a great influence to the total accuracy, if there occurs any disorder in the first stage, then correction or improvements cannot be effected, and finally, all of the adjustments and assemblings should be done over again. Furthermore, the skill level of an assembling worker exerts a great influence on the total accuracy.

SUMMARY OF THE INVENTION

The present invention has as its object the provision of a coordinate measuring instrument, wherein utilization of the top surface of the bedplate is raised to expand the measurable scape, the supports and the slider guide rails are facilitated in assembling and adjustment, no measuring error occurs during use and the manufacturing cost thereof is low.

The present invention features that, in a coordinate measuring instrument comprising guide rails protruded from opposite sides of a bedplate; a pair of supports supported in a manner to be movable along the guide rails; and a slider guide rail racked across these supports and movably supporting a slider having a measuring element; wherein a configuration or the like are measured from a displacement of the measuring element, one of the supports is supported on one of the guide rails in a manner to be positionally adjustable in a direction vertical to the top surface of the bedplate and a direction perpendicularly intersecting the vertical direction, the other of the supports is supported on the other of the guide rails in a manner to be displaceable in the direction of the one of the guide rails and non-displaceable in the vertical direction, further, posture adjusting means provided at connecting portions between the slider guide rail and the supports, the posture of the slider guide rail is changed by the posture adjusting means to make the measuring element positionally adjustable at least in directions of two axes perpendicularly intersecting each other, and the slider guide rail thus adjusted in posture is non-displaceably fixed in the moving direction of the slider when adjustment members provided in a manner to be positionally adjustable and fixable to the guide rails are in a predetermined abutting contact with said support.

BRIEF DESCRIPTION OF THE DRAWINGS

The drawings show one embodiment of the present invention, in which.

DETAILED DESCRIPTION OF THE PREFERRED EMBODIMENT

Description will hereunder be given of one embodiment, wherein the present invention is applied to a three dimensional measuring instrument.

Figure 1:
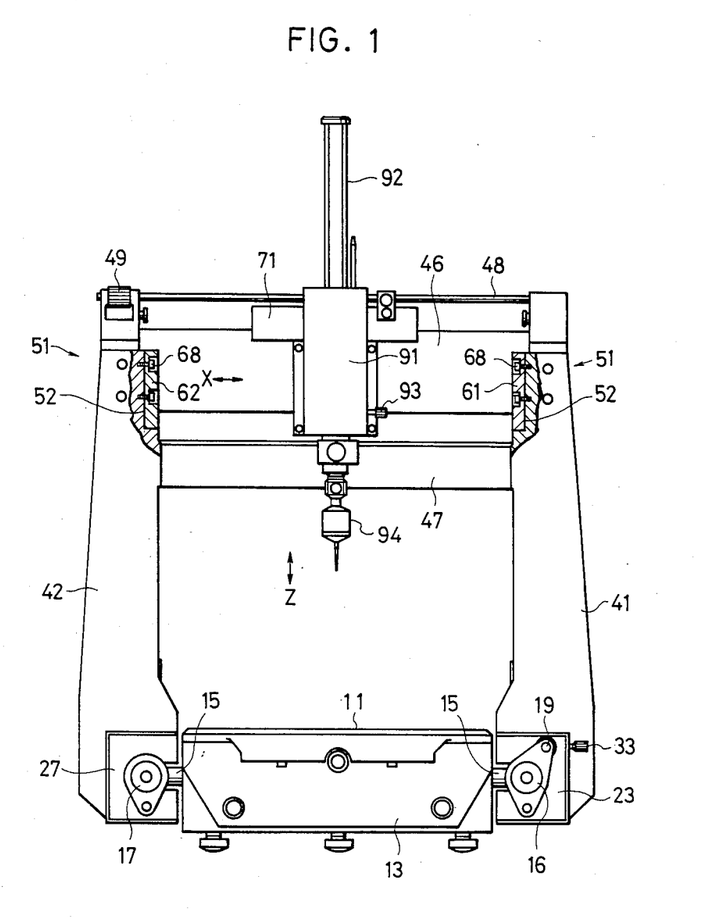
FIG. 1 is a front view showing the general arrangement.
Figure 2:
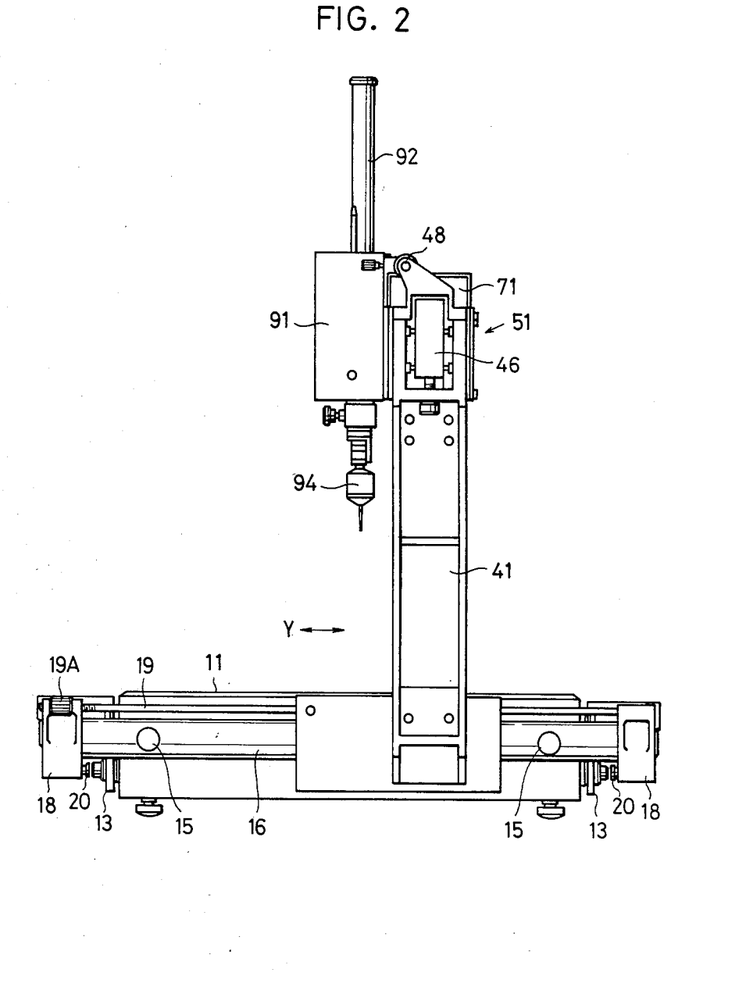
FIG. 2 is a side view thereof.

FIG. 1 shows the front view of the three-dimensional measuring instrument and FIG. 2 the side view thereof. Referring to these drawings, a bedplate 11 formed into a generally flat, rectangular parallelepiped is provided at the front and the rear surface thereof with handles 13 being of an L-shape in cross section and mounted at opposite side surfaces thereof with guide rails 16 and 17 in parallel to each other and along the longitudinal direction of the bedplate 11 (the direction of Y-axis) through a plurality of support shafts 15 protruded at right angles from the side surfaces of the bedplate 11.

Movably supported on the guide rails 16 and 17 are the bottom end portions of supports 41 and 42. Racked across the upper portions of the supports 41 and 42 are a slider fine movement rail 48 formed of a round rod, a slider guide rail 46 being a generally elongate rectangle in cross section and a transverse member 47, all of which are in parallel to the top surface of the bedplate 11 and perpendicular to the guide rails 16 and 17 (the direction of X-axis). The slider fine movement rail 48 can be finely moved in the direction of X-axis by the rotation of a fine movement knob 49 provided at the upper portion of the other support 42.

Stoppers 18 are provided at the front and the rear ends of one of the guide rails 16, and supported across the front and the rear stoppers 18 is a support fine movement rail 19 being in parallel to the guide rail 16 in a manner to be movable in the direction of Y-axis. This fine movement rail 19 can be finely moved in the direction of Y-axis by the rotation of a fine movement knob 19A. On the inner surfaces of the stoppers 18, there are provided shock absorbers 20 for absorbing the shocks when the supports 41 and 42 collide thereon.

Figure 3:
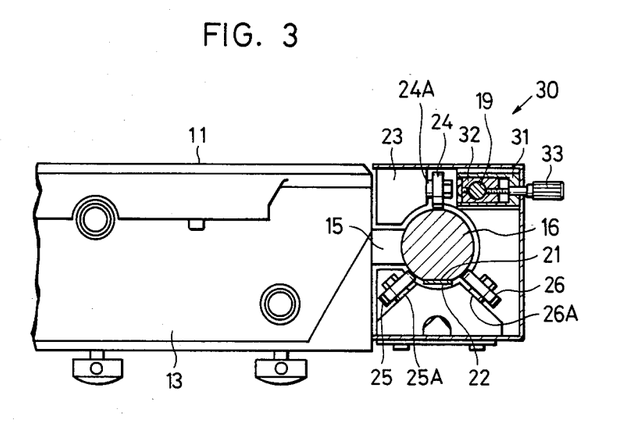
FIG. 3 shows the state of engagement between the guide rail and the proximal end of one of the supports.

As shown in FIG. 3, the aforesaid one 16 of the guide rails is provided at a position downwardly of the top surface of the bedplate 11 and protruded from the side surface of the bedplate 11, and formed into a circular shape in cross section and provided at the undersurface thereof with a horizontal surface portion 21. Mounted to the horizontal surface portion 21 is a main scale 22 forming a detector for detecting therealong a position of the support 41 in the direction of Y-axis and having a graduation of $\mu$m order. An engageable block 23 of the aforesaid one 41 of the supports, being engaged with the guide rail 16 is provided at the front and the rear ends thereof in the longitudinal direction of the guide rail (the direction of Y-axis) with a pair of groups of rollers each including three rollers 24, 25 and 26, which turn on the peripheral surface of one 16 of the guide rails in the longitudinal direction thereof, and further with a fine movement mechanism 30.

The rollers 24, 25 and 26 are arranged such that normal lines of the respective rollers to the peripheral surface of the guide rail 16 are disposed at intervals of 120°, the roller 24 is positioned on the top of the guide rail 16, and the rollers 24, 25 and 26 may be made eccentric by a predetermined value from the center lines of pivots 24A, 25A and 26A of the rollers. With this arrangement, the positions of the respective rollers 24, 25 and 26 in the normal line are made to be adjustable, whereby the rollers are reliably brought into contact with the guide rail 16. The fine movement mechanism 30 comprises a holding tube 31 provided in the engageable block 23; an engageable piece 32 movably housed in the holding tube 31 and slidably coupled onto the outer periphery of the support fine movement rail 19; and a lock knob 33 rotatably supported by the holding tube 31, for moving the engageable piece 32 to the right in FIG. 3 to selectively integrate the support fine movement rail 19 with the support 41 through the engageable piece 32. A threaded portion at the forward end of the lock knob 33 is threadably coupled to the engageable piece 32, and a knob portion is horizontally protruded from the side surface of the engageable block 23.

Figure 4:
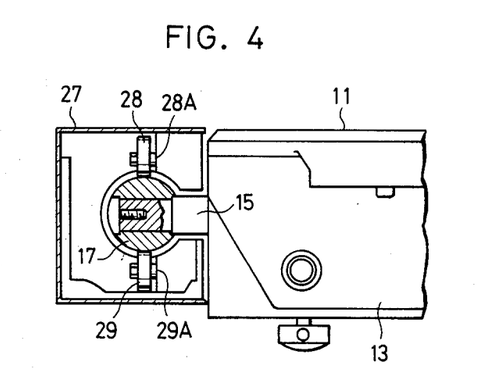
FIG. 4 shows the state of engagement between the guide rail and the proximal end of the other of the supports.

On the other hand, as shown in FIG. 4, an engageable block 27 of the other 42 of the supports, being engaged with the guide rail 17 is provided at the front and the rear ends thereof in the longitudinal direction of the guide rail (the direction of Y-axis) with a pair of groups each including two rollers 28 and 29. Normal lines of these rollers 28 and 29 to the peripheral surface of the guide rail 17 are disposed at intervals of 180°, positioned on the top and the bottom of the guide rail 17, and may be made eccentric by a predetermined value from the center lines of pivots 28A and 29A of the respective rollers 28 and 29. With this arrangement, the positions of the rollers 28 and 29 in the normal line are made to be adjustable, whereby the rollers are reliably brought into contact with the guide rail 17. In this case, the both rollers 28 and 29, i.e. the support 42 is made to be movable in the axial direction of the support shaft 15 (the direction of X-axis).

Figure 5:
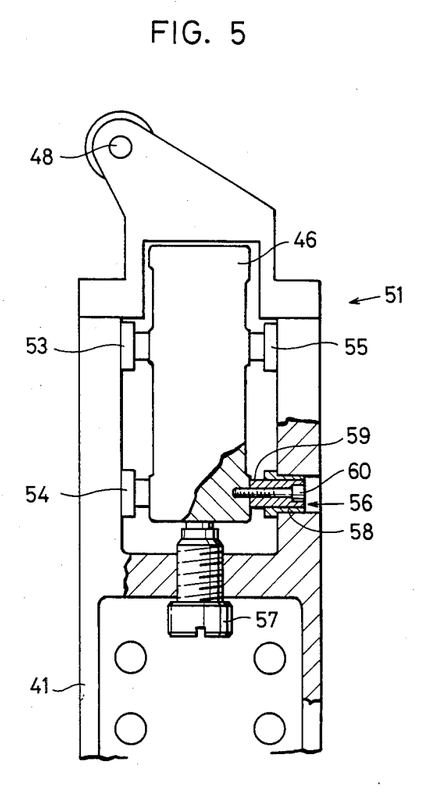
FIG. 5 shows the posture adjusting means.

The support 41 and 42 supporting the end portions of the slider guide rail 46, are provided with posture adjusting means 51 for changing the posture of the slider guide rail 46, respectively, and formed at the inner surfaces thereof with pressure receiving surfaces 52 opposed to each other. As shown in FIG. 5, the posture adjusting means 51 comprises four posture adjusters 53, 54, 55 and 56 provided at positions of the support post 41 or 42 opposed to the upper and the lower portions of the front or the rear surface of the slider guide rail 46; and bolts 57 each provided at a position of the support 41 and 42 opposed to the undersurface of the slider guide rail 46, for supporting the undersurface of the slider guide rail 46. The posture adjusters 53 to 56 are each constituted by: a reinforcing nut 58 fixed to the support 41 or 42; a positioning bush 59 threadably coupled into this reinforcing nut 58 and abutted at the forward end thereof against the front or the rear surface of the slider guide rail 46; and a bolt 60 penetrating through this positioning bush 59 and threadably coupled into the slider guide rail 46.

Figure 6:
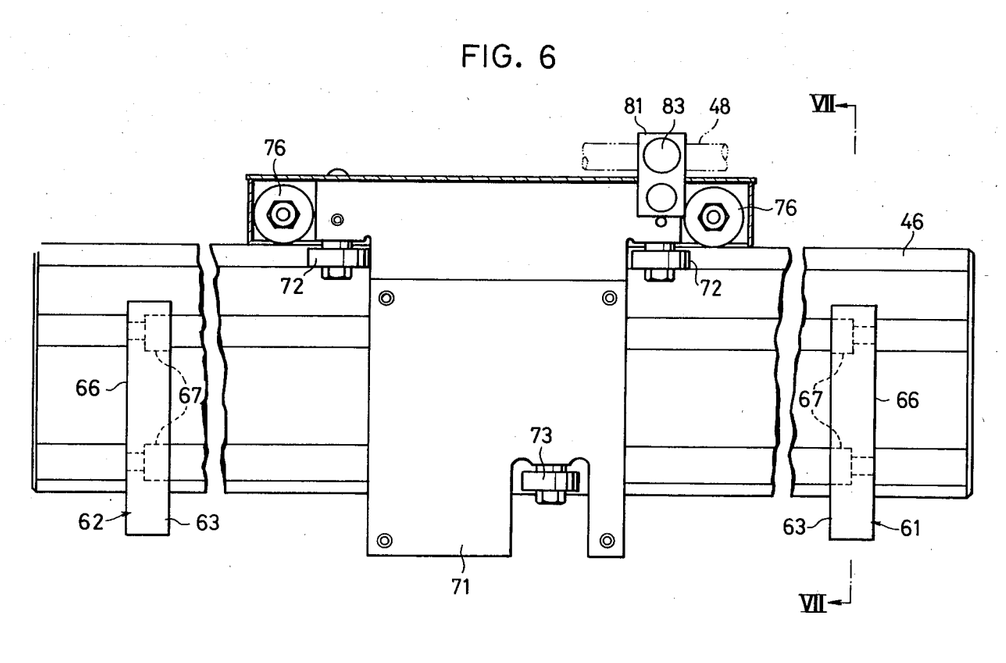
FIG. 6 is a front view showing the essential portions of the slider guide rail.
Figure 7:
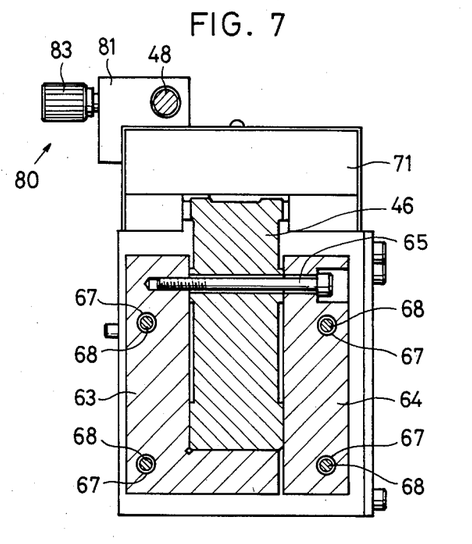
FIG. 7 is a sectional view taken along the line VII—VII in FIG. 6.

On the other hand, as shown in FIG. 6, the slider guide rail 46 is provided at opposite end portions thereof with U-shaped adjustment members 61 and 62 in a manner to be positionally adjustable and fixable, and a slider 71 is movably provided therebetween. As shown in FIG. 7, each of the adjustment members 61 and 62 is constituted by: an L-shaped first adjustment member 63 abutted against the front and the under surfaces of the slider guide rail 46; an I-shaped adjustment member 64 abutted against the rear surface of the slider guide rail 46; and a bolt 65 starting from the top portion of this second adjustment member 64, penetrating through the slider guide rail 46 and threadably coupled into the top portion of the first adjustment member 63. With this arrangement, the first and the second adjustment members 63 and 64 are made positionally adjustable relative to the slider guide rail 46. Furthermore, each of the first and the second adjustment members 63 and 64 is provided with an abutting surface 66 opposed to the pressure receiving surface 52 formed on each of the supports 41 and 42. This abutting surface 66 is brought into surface-to-surface contact with the pressure receiving surface 52, so that loosenesses do not occur in the clearance and the like of the threads due to the starting motion, stop, collision and the like of the slider during its operation. Each of the first and the second adjustment members 63 and 64 is formed therein with bolt insertion holes 67 for receiving bolts 68 for closely, solidly securing the first or the second adjustment member 63 or 64 to the pressure receiving surface 52 of the support 41 or 42. Additionally, each of the bolt insertion holes 67 is formed slightly larger in diameter than the bolt 68, so that the first and the second adjustment members 63 and 64 can be closely, solidly secured to the supports 41 and 42 even when the slider guide rail 46 is adjusted in its posture.

Figure 8:
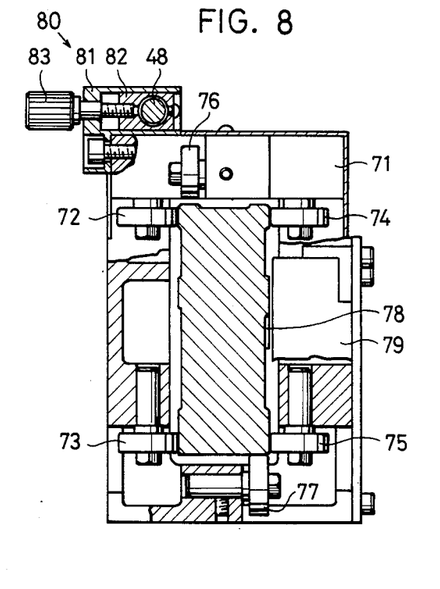
FIG. 8 is a sectional view showing the slider.

Furthermore, as shown in FIGS. 6 and 8, the slider 71 is provided at opposite sides thereof with four rollers 72 to 75, which turn on the top and the bottom edges of the front and the rear surfaces of the slider guide rail 46 and further two rollers 76 and 77, which turn on the top and the bottom surfaces of the slider guide rail 46. The slider 71 is provided therein with a position detector 79 for detecting a position of the slider 71 in cooperation with a scale 78 provided on the rear surface of the slider guide rail 46 in the longitudinal direction thereof. The slider 71 is provided at the top portion thereof with a fine movement mechanism 80 for finely moving the slider 71 in the direction of X-axis due to the movement of the slider fine movement rail 48 and secured on the front surface thereof with a spindle supporting block 91. The fine movement mechanism 80 includes a holder 81 fixed to the slider 71; an engaging element movably housed in this holder 81 and slidably coupled to the slider fine movement rail 48; and a lock knob 83 for displacing this engaging element 82 in a direction perpendicularly intersecting the slider fine movement rail 48 to selectively integrate the slider fine movement rail 48 with the slider 71 through the engaging element 82. The fine movement mechanism 80 is of the generally same arrangement as the fine movement mechanism 30 provided in the engageable block 23.

The spindle supporting block 91 is provided with a spindle 92 in a manner to be vertically movable in a direction perpendicularly intersecting the guide rails 16, 17 and the slider guide rail 46, respectively (the direction of Z-axis), and threadably coupled to the lower portion of one side thereof with a lock knob 93 for locking the spindle 92 at a desirable position. Secured to the bottom end of the spindle 92 is a touch signal probe 94 as being a measuring element.

Description will hereunder be given of the methods of assembling and adjusting this embodiment. Firstly, the supports 41 and 42 are supported by the guide rails 16 and 17 of the bedplate 11 in a manner to be perpendicular to the top surface of the bedplate 11, spaced a predetermined distance apart from and in parallel to each other, and subsequently, the posture of the slider guide rail 46 racked across the both supports 41 and 42 is adjusted by the posture adjusting means 51.

To perform this adjustment, firstly, an article of the standard dimensions is set on the bedplate 1, thereafter, such an adjustment is conducted that the bolts 60 for the posture adjusters 53 to 56 are loosened to a suitable degree, the respective positioning bushes 59 are linearly moved, the bolt 57 is linearly moved, and the touch signal probe 94 being in contact with the article of the standard dimensions is made accurately movable in the directions of X- and Z-axes, respectively.

Upon completion of this adjustment, the abutting surfaces 66 of the first and the second adjustment members 63 and 64 of the adjustment members 61 and 62 are closely attached to the pressure receiving surfaces 52 of the supports 41 and 42, and thereafter, the bolts 68 are inserted through the bolt insertion holes 67, whereby the first and the second adjustment members 63 and 64 are fixed to the supports 41 and 42.

Then, each of the bolts 65 connecting the first and the second adjustment members 63 and 64 to each other is tightened, whereby the slider guide rail 46 is fixed to the supports 41 and 42 through the adjustment members 61 and 62, the abutting surfaces 66 of which are closely, solidly secured to the pressure receiving surfaces 52 of the supports 41 and 42.

When the adjustment is completed as described above, similarly to the conventional three-dimensional measuring instrument the touch signal probe 94 is moved in the three-dimensional directions, and brought into abutting contact with portions of a work to be measured, successively, whereby the dimensions, configuration and the like of the work can be measured.

In this case, even when the slider 71 collides on the adjustment members 61 and 62 due to the movement of the slider 71 in the direction of X-axis, no dimensional error occurs between the adjustment members 61, 62 and the supports 41, 42, because the abutting surfaces 66 of the adjustment members 61 and 62 are closely attached to the pressure receiving surfaces 52 of the supports 41 and 42, with the result that no influence is exerted on the accuracy.

In consequence, in this embodiment, the supports 41 and 42 are supported by the side surfaces of the bedplate 11, so that the whole area of the top surface of the bedplate 11 can be made to be an effective area of measuring and the bedplate 11 made of an expensive stone surface plate or the like can be made small. From this point view too, the manufacturing cost of the measuring instrument can be reduced and moreover, the measuring instrument can be small-sized, so that installation space can be decreased. Furthermore, there is no obstruction on the top surface of the bedplate 11, so that the carry-in and carry-out of the work are not restricted, the work which is larger than the top surface of the bedplate 11 can be installed, and moreover, the posture of installation is not limited. The whole surface of the bedplate 11 is open, so that the operator is not limited in selecting his position, thus facilitating the use. The whole body of the measuring instrument is small-sized, so that the measuring instrument is conveniently portable.

Furthermore, the aforesaid one 16 of the guide rails is formed into a circular shape in cross section and provided at the undersurface thereof with a horizontal surface portion 21, and the scale 22 is secured to this horizontal surface portion 21, so that neither damages are caused nor contaminations adhere to the scale 22, thus enabling to protect the scale 22.

Furthermore, the three rollers 24 to 26 opposed to the aforesaid one 16 of the guide rails are arranged at intervals of 120° and one 24 of the rollers is disposed on the top of the guide rail 16, so that the load of the structure can be stably received and the lock knob 33 and the like can be secured to the side surface of the engageable block 23, whereby the lock knob 33 and the like do not protrude from the top surface of the bedplate 11, so that no trouble is caused to the carry-in and carry-out of the work.

The three rollers 24 to 26 are arranged in the above-described positional relationship with the aforesaid one 16 of the guide rails and the two rollers 28 and 29 relative to the other 17 of the guide rails are arranged at the positions spaced 180° apart from each other in the vertical direction, whereby the adjustment of the supports 41 and 42 in the direction of X-axis and the adjustment thereof in the direction of Z-axis can be performed independently of each other by the adjustments of the rollers 24, 25, 26, 28 and 29 in their eccentric values. With this arrangement, the adjustment operation of $\mu$m order can be relatively easily.

The adjustment of accuracy is performed through the touch signal probe 94 itself upon completion of assembling of the structure as a whole. The adjustment is performed by use of the posture adjusting means 51, so that assembling is completed for a short period of time without requiring high skill in assembling. Further, adjustment can be performed after the assembling, whereby the under of highly finished parts can be decreased and the adjustment can be facilitated, and the manufacturing cost can be reduced to a considerable extent with the accuracy being secured, so that the transportability can be improved because the adjustment during transportation can be performed easily.

Furthermore, the slider guide rail 46 is fixed to the supports 41 and 42 in a manner to be non-displaceable in the moving direction of the slider 71 through the adjustment members 61 and 62 but not through the posture adjusting means 51, whereby, even when the slider 71 collides on the adjustment members 61 and 62 due to the movement and the like of the slider 71, no dimensional error occurs between the adjustment members 61, 62 and the supports 41, 42, because the abutting surfaces 66 of the adjustment members 61 and 62 are closely attached to the pressure receiving surfaces 52 of the supports 41 and 42, with the result that no influence is exerted on the accuracy.

In the above embodiment, as the measuring element, there has been illustrated one of the contact type construction, i.e. the touch signal probe 94, however, the measuring element according to the present invention need not necessarily be limited to this, and there are used so-called contact type ones including a measuring element using electrostatic capacity, a laser length measuring instrument or the like.

The present invention need not necessarily be limited to the three-dimensional measuring instrument, and may be applied to a two-dimensional measuring instrument, wherein the measuring element is made not movable in one direction of some axis out of the directions of three axes or a measuring instrument of other type such as a contour measuring instrument. However, it is more effective if the present invention is applied to a three-dimensional measuring instrument, wherein the construction is large-sized and the manufacturing cost is high.

As has been described hereinabove, the present invention can provide the coordinate measuring instrument, wherein the effective utilization of the top surface of the bedplate is improved, the measurable scope is widened, the problem of carry-in and carry-out of the work is solved, further, the assembling and adjusting of the supports, slider guide rail and the like are easily performed and no error in accuracy occurs during use.

What is claimed is:

1. A coordinate measuring instrument, comprising:
    a bedplate;
    a pair of elongated and parallel guide rails respectively protruded from opposite side surfaces of said bedplate;
    a pair of supports respectively movably supported on said guide rails along the axial length of said guide rails, one of said supports including first means for effecting a positional adjustment in a first direction perpendicular to an upwardly facing top surface of said bedplate and a second direction perpendicularly intersecting said first direction, and the other of said supports being displaceable in said second direction and non-displaceable in said first direction, each of said supports having a first surface means thereon opposed to the other said first surface means;
    a slider guide rail connected to and extending between said supports and having supported thereon a slider movable in the longitudinal direction of said slider guide rail, said slider having a measuring element;
    second means for facilitating an adjustment of the position of said slider guide rail relative to said supports in at least two directions perpendicularly intersecting each other, said second means being provided on said respective supports and including four adjusters opposed to and engaging upper and lower portions of each front and rear surfaces of said slider guide rail, said adjusters being respectively adjustable in position relative to said slider guide rail, and members for supporting an undersurface of said slider guide rail and being linearly adjustably movable in said first direction; and
    a pair of positionally adjustable members fixably secured to said supports and said slider guide rail and including a third means for facilitating a relative adjustment in position between said slider guide rail and each said support, each of said adjustable members having a second surface means in face-to-face abutting relation with said first surface means on said support so that said slider guide rail is non-displaceably fixed relative to said supports in a moving direction of said slider.

2. A coordinate measuring instrument as set forth in claim 1, wherein one of said guide rails is of a circular shape in cross section and has along an undersurface thereof a horizontal flat surface portion secured to a scale.

3. A coordinate measuring instrument as set forth in claim 2, wherein one of said supports is supported on a one of said guide rails by three rollers, each having normal lines to the peripheral surface of said guide rail and arranged at intervals of 120° with one roller being positioned on top of said guide rail.

4. A coordinate measuring instrument as set forth in claim 3, wherein the other of said guide rails is of a generally circular shape in cross section and the other of said supports is supported through rollers arranged in the vertical direction at intervals of 180°.

5. A coordinate measuring instrument as set forth in claim 1, wherein each said adjuster comprises: a nut fixed to said support; a positioning bush threadably coupled into said nut and abutted at the forward end thereof against said slider guide rail; and a bolt penetrating through said positioning bush and threadably coupled into said slider guide rail.

6. A coordiante measuring instrument as set forth in claim 1, wherein said contact between said adjustable members and said supports is made such that pressure receiving surfaces formed on said both supports in opposed relationship to each other and abutting surfaces provided on said adjustable members in opposed relationship to said pressure receiving surfaces are closely attached to each other.

7. A coordinate measuring instrument as set forth in claim 6, wherein said pressure receiving surfaces each extend in a direction perpendicularly intersecting the axial direction of said slider guide rail.

8. A coordinate measuring instrument as set forth in claim 1, wherein each said adjustable member is formed into a U-shape, into which said slider guide rail is rceived and the top portions of said U-shape are connected to each other through a bolt, whereby said adjustable member is secured to said slider guide rail.

9. A coordinate measuring instrument as set forth in claim 8, wherein each said adjustment member includes a combination of an L-shaped first adjustable member with an I-shaped second adjustment member.

10. A coordinate measuring instrument as set forth in claim 8, wherein each said adjustment member is bolted to said abutting surface.

11. A coordinate measuring instrument as set forth in claim 1, wherein a fine movement mechanism is provided at the bottom end portion of one of said supports and a lock knob forming a part of said fine movement mechanism extends on a side of said support remote from a top surface of said bedplate.

* * * * *